United States Patent [19]
Moore et al.

[11] 4,383,859
[45] May 17, 1983

[54] INK JET INKS AND METHOD OF MAKING

[75] Inventors: Michael T. Moore, Longmont; John M. Olson, Boulder; Donald A. Stremel, Northglenn, all of Colo.

[73] Assignee: International Business Machines Corporation, Armonk, N.Y.

[21] Appl. No.: 264,760

[22] Filed: May 18, 1981

[51] Int. Cl.$^3$ ............................................. C09D 11/02
[52] U.S. Cl. .............................. 106/22; 260/DIG. 38
[58] Field of Search .................. 106/22; 260/DIG. 38

[56] References Cited

U.S. PATENT DOCUMENTS

| | | | |
|---|---|---|---|
| 3,705,043 | 12/1972 | Zabiak | 106/20 |
| 3,846,141 | 11/1974 | Ostergren et al. | 106/22 |
| 3,870,528 | 3/1975 | Edds et al. | 106/22 |
| 4,184,881 | 1/1980 | Bradley | 106/20 |

OTHER PUBLICATIONS

*IBM Technical Disclosure Bulletin*, vol. 21, No. 6, Nov. 1978, "Chelating Agents for Jet-Printing Ink," by R. S. Cutler and S. R. Fuller, p. 2234.

*Primary Examiner*—John Kight, III
*Assistant Examiner*—Amelia B. Yarbrough
*Attorney, Agent, or Firm*—Francis A. Sirr

[57] ABSTRACT

An ink jet printing ink is first formulated in concentrated form, and in this form it is subjected to stressful operating conditions such as an elevated temperature. This stress causes particle formation. After filtration to remove these particles, the final ink formulation is prepared, including for the first time ingredients which inhibit particle formation.

6 Claims, No Drawings

INK JET INKS AND METHOD OF MAKING

DESCRIPTION

1. Technical Field

The invention relates to ink jet printing inks, and specifically to those which are water based and are used to mark cellulose based recording media such as paper.

2. Background of the Invention

The basic technique of ink jet printing involves the use of one or more nozzle assemblies which are connected to an ink source. Each nozzle includes a small orifice from which ink droplets are caused to be directed onto the printing medium.

Once the ink leaves the orifice, it must break up into a stream of uniformly spaced drops (continuous stream technique), or it must form a single drop (drop-on-demand or impulse jet technique), the drops always being of uniform size. The source of drops must be turned on and off (drop-on-demand technique), or the drops in a stream must be controlled so that only certain drops are allowed to reach the paper (continuous stream technique). Placement of the drops in the paper's X-Y axis must be controlled.

A continuous stream device functions to provide a continuous stream of drops, only certain of which are controlled to hit the paper, all others being deflected to a gutter and recirculated for reuse. Typically, less than 10% of the drops hit the paper. Recycling of all other drops presents problems such as maintaining ink viscosity and ink purity. The nozzle orifice for continuous jet printing is typically in the range 0.0005 to 0.003 inch in diameter.

In a drop-on-demand device, each drop that leaves this orifice is intended to strike the paper, thus, the name drop-on-demand. This type of operation raises the problem that the ink must dry quickly on the paper, and yet must not dry and cake the nozzle orifice. Drop-on-demand devices have been provided with an automatic or semi-automatic nozzle cleaning system, a purge system to clear clogged nozzles, and a covering system to cover the nozzles when the printer is not in use.

Some generalizations can be made relative to inks usable in ink jet devices. The ink must have minimal size particles, or no particles at all, in order to reduce or eliminate nozzle clogging by the particles. The ink must be chemically compatible with the ink jet hardware, and must not produce mechanical wear of the hardware. The ink's physical properties must provide for consistent drop formation and flight, and must minimize drying at the nozzle. Growth of bacteria, or other insoluble particulate matter which may clog the nozzle, must be prevented, and the ink must permanently mark the paper.

The ink's physical properties which must be defined usually include its viscosity, specific gravity, surface tension, conductivity and pH.

The ink must produce good optical density; it must not objectionably feather or spread; it must dry or set up quickly, with good water-fastness and soak resistance; and it must possess good resistance to fading, rubbing and smearing.

In order to minimize servicing of the ink jet device, the ink must be machine compatible; that is, the ink should not contaminate the machine with particles, should not be corrosive, should provide no biological growth, should have long shelf life, and should provide no chemical or health problems.

U.S. Pat. No. 3,870,528 describes a water based ink jet ink which includes water soluble nigrosine dye. This patent states that, in the absence of other ingredients, the dye/water solution agglomerates at a continuous rate, causing filters to clog with nigrosine dye particles. As stated, the combination of nigrosine dye and a second dye, Phenamine black, is believed to cause a stabilizing interaction to occur between the ink's different materials, thereby converting the nigrosine-based ink from unstable to stable. This ink includes polyethylene glycol, in the form of the brand Carbowax 1500 (Union Carbide Corporation), as an anti-crusting agent which prevents the nigrosine from forming a crystalline film over the nozzle orifice as water evaporates during shutdown. Propylene glycol is also said to produce this effect. Butyl Carbitol is added to enhance stabilization of the dye components in water. Butyl Carbitol is 2-(2-Butoxyethoxy) ethanol. NM2P(N-methyl-2-pyrrolidone) is used to solubilize the Phenamine black dye. Sodium Omadine brand (Olin Chemical Corp.) sodium-2-pyridinethiol 1-oxide is used as a fungicide or antibacterial agent. The brand Triton X-100 (Rohm & Haas Co.) surfactant, believed to be alkylaryl polyether alcohol, is provided and is believed to produce the same effect as NM2P.

Glycols generally have found use in ink jet ink, and U.S. Pat. Nos. 3,705,043 and 3,846,141 suggest the use of diethylene glycol as a humectant.

The need for a chelating agent in ink jet ink is recognized by the *IBM Technical Disclosure Bulletin* of November, 1978 at page 2234. Specifically, this chelating agent is the trisodium salt of N-(hydroxyethyl)-ethylenediamine triacetic acid ($Na_3$ HEDTA). A brand example of this salt is Versenol 120 by Dow Chemical Company.

Acetylenic alcohols or glycols, or their ethoxylated derivatives (of which the organic surface-active agents sold under the trademark Surfynol by Air Products and Chemicals Co. are examples) have been used in ink jet inks. For example, U.S. Pat. No. 4,184,881 suggests the use of Surfynol 485 as a humectant in an aqueous solution of a water-soluble dye.

Above-mentioned U.S. Pat. No. 3,870,528 discusses nigrosine dye instability in ink jet ink. Many components used in dye manufacturing are probable causes for this instability. Probable causes are diluent salts added to the dye for standardization, the presence of sparingly-soluble organic dye synthesis by-products, and high concentrations of alkali insoluble inorganic cations, i.e., iron, copper, calcium, silica and magnesium. All of the above-mentioned impurities precipitate from an ink and agglomerate. The agglomerates interfere with filtration by micron-rated filters, and restrict fluid flow through ink jet nozzle orifices. These agglomerates also reduce the ink's concentration of soluble dye, and hence cause a lowering of the tinctorial strength, reducing optical density of the printed ink.

U.S. Pat. No. 3,870,528 teaches the inclusion of an additional dye in combination with a nigrosine dye to eliminate agglomeration. Examples of the dyes used are Direct Black 4 and Direct Black 38.

THE INVENTION

The present invention provides toxicologically safe, water-based, ink jet inks of high tolerance to evaporation, and good water-fastness and light-fastness. In addition, this ink exhibits exceptionally rapid paper penetration, resists particle growth, and remains stable under stressful environments such as heat, cold and evaporation.

The present invention provides a unique ink formulation, for use primarily in continuous stream devices. This formulation is described in modified form, having a higher viscosity, when it is to be used in drop-on-demand devices.

A list of toxicologically safe dyes is provided. These dyes are used in pure presscake form. Nigrosine dye is readily available at an attractive cost in less pure form, and a dye purification process for this dye is described.

The most critical feature of the present invention is an ink preparation, aging and filtration process which produces inks of the present invention. In this process an ink concentrate, which does not include all of the ink's ingredients, is processed in a unique manner, simulating the stress the ink will experience under use. This stress produces precipitates which are then removed by filtering, prior to mixing of the final ink formulation.

The novel inks of the present invention are based on the following vehicle system where weight percent is given:

|  | Weight % |
| --- | --- |
| Dye | about 3 to 10 |
| Carbowax 200 | 10 |
| Diethylene Glycol | 10 |
| Butyl Carbitol | 4 |
| N—Methyl-2-Pyrrolidone | 4 |
| Surfynol 104 | 0.25 |
| Triton QS-44 | 0.2 |
| Versenol 120 | 0.5 |
| Sodium Omadine | 0.1 |
| Water | 67.95 to 64.95 |
| Ammonium Hydroxide | 0.1 to 1 |

The amount of ammonium hydroxide to be used, in the range 0.1 to 1 weight percent, is a function of the dye to be used.

Carbowax 200 is a brand of polyethylene glycol by Union Carbide Corporation.

Butyl Carbitol is a brand of diethylene glycol monobutyl ether, 2-(2-Butoxyethoxy) ethanol, by Union Carbide Corporation.

Surfynol 104 is a brand of organic surface-active agents, more specifically tetramethyl decynediol, by Air Products and Chemicals Company.

Triton QS-44 is a brand of surfactant based on a proprietary structure thought to be an anionic phosphate ester surfactant by Rohm & Haas Company.

Versenol 120 is a brand of trisodium salt of N-hydroxyethylethylenediaminetriacetic acid ($C_{10}H_{15}O_7N_2Na_3$) by the Dow Chemical Company. Sodium Omadine is a brand of sodium-2-pyridinethiol-1-oxide by Olin Chemical Corporation.

Examples of usable dyes, in pure presscake form, or purified nigrosine dye, are as listed below, showing the weight percent to be used in the above vehicle system. Presscake dyes are necessary in order to minimize the presence of ingredients, such as diluent salts, which while acceptable for many uses of the dye, are harmful to stability of an ink jet ink.

| Blue | ⅓ Nigrosine, ⅓ Pyrazole Fast Turquoise-FBL (Presscake), ⅓ Alizarin Cyanine Blue-6B | 3.0% |
| --- | --- | --- |

| -continued | | |
| --- | --- | --- |
| Red | Cartasol Red 3BF | 3.0% |
| Green | Pyrazole Fast Turquoise-FBL (Presscake) | 1.5% |
|  | Amafast Orange 4GLL | 1.5% |
| Brown | Lanasyn Dark Brown-SGL | 6.0% |
| Orange/Gold | Amafast Orange 4GLL | 3.0% |
| Yellow | Atlantic Milling Yellow | 3.0% |

Nigrosine is a brand of dye by American Cyanamid. Pyrazole Fast Torquoise-FBL, Lanasyn Dark Brown-SGL, and Cartasol Red 3BF are brands of dyes by Sandoz Colors and Chemicals Company. Alizarin Cyanine Blue-6B is a brand of dye by Keystone Aniline and Chemical Company. Amfast Orange 4GLL is a brand of dye by American Color and Chemicals Company. Atlantic Milling Yellow is a brand of dye by Atlantic Chemical Corporation.

The present invention offers specific advantages in the use of nigrosine dye in an ink. One advantage is the ability to use high concentrations (6–9%) of this toxilogically safe dye, in comparison to prior uses of about 2% in combination with dyes which are benzidine based. Another advantage is the relatively low cost of nigrosine, which even after purification as described herein is less expensive than many other known water soluble dyes.

In order to purify nigrosine dye in accordance with the present invention, the following procedure is followed—750 grams of Nigrosine O2P Powder (a brand by American Cyanamid) is dissolved in 3500 milliliters of water and 40 grams of concentrated ammonium hydroxide. This procedure solubilizes the dye. This solution is then poured rapidly into a solution of 1200 milliliters of concentrated hydrochloric acid in 8000 milliliters of water. The metal-ion-impurities contained in the dye are soluble in the acid. However, the dye molecules per se are not. Thus, the dye now precipitates out of solution. The resulting slurry is stirred for 18 hours, and then is filtered through Wattman #1 filter paper into a 32 cm Büchner funnel in order to collect the insoluble nigrosine dye in its solid form. The resulting dye cake, which is held by the filter paper, is now dried, and then re-slurried in a solution of 40 grams of concentrated hydrochloric acid in 3500 milliliters of water. The slurry is filtered again through Wattman #1 filter paper into a 32 cm Buchner funnel. At this point, substantially all of the acid soluble impurities originally present in the dye have been removed from the resulting dye cake. The resulting dye cake is washed with 16,000 milliliters of de-ionized water and dried. The expected dye cake recovery is 75–85%, and the dye cake exhibits greatly reduced levels of diluent salts and alkali insoluble cations (i.e. inorganic salts).

The aging and filtration process of the present invention involves preparing a concentrated ink liquid which lacks a portion of the water and some of the constituents (i.e. the chelating agent and/or the biocide) of the final ink formulation. This concentrate is aged for three days at 50° C. before processing by filtration.

During this aging process, the concentrated ink of the present invention experiences environmental stress. This stress simulates operational evaporation which, with prior art ink jet inks, actually causes failure of the ink and/or ink jet printing hardware by means such as particle growth or formation. Since the concentrate of the present invention does not include, for example the chelating agent, particle growth or formation is actually encouraged during the aging process of the present invention, with the end result being that by subjecting the concentrate to stressful operating conditions during the ink's manufacture, the ink of the present invention is surprisingly more able to withstand stress during subsequent use in ink jet printing hardware.

The mixing, dilution and filtration of the ink concentrate will be described stepwise.

The composition of the concentrate, when using purified nigrosine dye, is as follows. Both the weight percent and the gram weight of the various constituents are given.

|  | Weight % | Gram Wt. |
|---|---|---|
| Nigrosine (Purified) | 7.0 | 105 |
| Carbowax 200 | 10.0 | 150 |
| Diethylene Glycol | 10.0 | 150 |
| N—Methyl Pyrrolidone | 4.0 | 60 |
| Butyl Carbitol | 4.0 | 60 |
| Surfynol 104 | 0.25 | 3.75 |
| Trition QS-44 | 0.2 | 3.0 |
| Sodium Omadine | 0.1 | 1.5 |
| Ammonium Hydroxide | 1.0 | 15 |
| D.I. Water | 33.45 | 501.75 |

Note that this concentrate does not include the Versenol 120 chelating agent (generically, HEDTA) which will appear in the final formulation. As a result, impurities such as metal ions are rendered more susceptible to being rendered insoluble by the stress of the hereinafter described aging process to which the concentrate is subjected.

A four-step procedure is used to prepare and mix this ink concentrate.

In step one, the Carbowax 200, Diethylene Glycol, N-Methyl Pyrrolidone, and Butyl Carbitol are combined in a tared, one-half gallon container. The solution is stirred while the Surfynol 104 is added and dissolved. Dissolution time is about 20 minutes. This step facilitates rapid dissolving of the Surfynol.

In step two, the Triton QS-44 is weighed into a one-liter beaker. Water is then weighed into the beaker containing the QS-44. Sodium Omadine is weighed and added to the water/QS-44. These components are stirred to solution. This step is generally done while the Surfynol of step one is dissolving. The basic ink vehicle, less the dye, has now been formulated.

In step three, the dye, nigrosine in this case, is weighed out, as well as the Ammonium Hydroxide. The Ammonium Hydroxide is added to the water/QS-44 Sodium Omadine solution. The resulting solution is then added to the glycol solvent/surfynol solution and stirred for a few minutes. The nigrosine is added and the system is stirred for one hour.

After stirring, the solution is placed in an oven at about 50° C. for 60-65 hours as step four. This critical step of the present invention, wherein the ink concentrate is subjected to operational stress, is believed to cause impurities, normally soluble in conventional ink manufacture, to become insoluble and agglomerate. Another explanation of the need for this step is that conventional ink formulation processes often produce seemingly stable inks which are in fact super-saturated dye solutions. In a period of time, these conventional inks equilibrate to a saturated state, with consequent precipitation or particle growth. It may be that the aging step of the present invention produces this equilibration at an accelerated rate by virtue of time, temperature, ink concentration and elimination of ink constituents which are used to stabilize the ink, the Versenol 120 chelating agent being a prime example.

After aging, the concentrate is filtered and diluted to the final ink formulation, again in a four-step process.

As step one of this final formulation process, the concentrate is cooled to about 25° C. A 1.5μ cartridge filter (Sealkleen brand by Pall Trinity Corp.) is pre-coated with 20 grams of Celite 577 brand (Johns-Manville Corp.) diatomaceous earth. This process is accomplished by slurrying the Celite in 600 milliliters of D.I. water and passing the slurry into the filter. Ten grams of Celite 577 is now added and dispersed throughout the cooled ink. The ink/Celite mixture is now passed one time through the pre-coated filter at 60-70 psi.

Relative to the selection of the diatomaceous earth to be used, the Celite brand is preferred since it produces superior results, for reasons not presently understood.

In step two, the filtered ink is weighed and the amount of dilution water is calculated. The amount of Versenol 120 is calculated from the total amount of ink. Generally, Versenol is added in an amount of 0.5% by weight of the yield in the foregoing steps. The formulas used to determine the amount of water and Versenol to add can be calculated as follows:

Weight of concentrate ÷ 0.70 = total amount of ink
Total amount of ink minus weight of concentrate = amount of water added to concentrate
Total amount of ink × 0.5% = amount of Versenol 120

The Versenol 120 is first dissolved in the diluent water. This solution is then added to the filtered concentrate.

In step three, 30 grams of Celite 577 is added and dispersed in the now-diluted ink. This slurry is then passed two times through a 1.5μ Seelkleen filter. In this step, the Celite operates to absorb insoluble oils which may be present in the diluted ink.

As the fourth step, the Celite processed and diluted ink is passed two times through a 0.2μ Sealkleen "NRP" filter for final filtration. The finished ink is now ready for use.

A preferred composition of a nigrosine-based ink jet ink in accordance with the present invention is as follows, wherein the percentage is expressed as a weight percent of the total ink composition. This ink is particularly useful in continuous stream devices.

|  | Weight % |
|---|---|
| Nigrosine Black Dye | 7.0 |
| Carbowax 200 | 10.0 |
| Diethylene Glycol | 10.0 |
| Butyl Carbitol | 4.0 |
| N—Methyl-2-Pyrrolidone | 4.0 |
| Surfynol 104 | 0.25 |
| Triton QS-44 | 0.2 |
| Versenol 120 | 0.5 |
| Sodium Omadine | 0.1 |
| Water | 62.95 |
| Ammonium Hydroxide (28%) | 1.0 |

A preferred modification of this ink, for particular use in drop-on-demand devices is as follows. Note this ink does not include Surfynol 104.

|  | Weight % |
|---|---|
| Nigrosine dye | 14.0 |
| Carbowax 200 | 20.0 |
| Diethylene Glycol | 20.0 |
| N—Methyl-2-Pyrrolidone | 8.0 |

| | Weight % |
|---|---|
| Butyl Carbitol | 8.0 |
| Versenol 120 | 0.5 |
| Triton QS-44 | 0.4 |
| Sodium Omadine | 0.2 |
| Ammonium Hydroxide | 2.0 |
| Water | 27.4 |

While the invention has been particularly shown and described with reference to preferred embodiments thereof, it will be understood by those skilled in the art that various changes in form and details may be made therein without departing from the spirit and scope of the invention.

What is claimed is:

1. In a process for making water-based ink jet ink; the improvement comprising the sequential steps of:
   (1) formulating a diluted water-based concentrate of the ink formulation which is essentially free of agents known to inhibit particle formation and growth;
   (2) subjecting the concentrated ink to the operational stress of an elevated temperature of about 50° C. for a period of time sufficient to produce particle formation and growth;
   (3) filtering the concentrated ink to remove said particles; and
   (4) thereafter adding an aqueous vehicle a chelating agent and biocide to inhibit particle growth and formation from the final ink formulation.

2. The process of claim 1 including the step of formulating said diluted water-based concentrate with a purified and/or a presscake dye.

3. The process of claim 2 wherein said purified dye is nigrosine, and including the steps of making said purified nigrosine dye by solubilizing only the impurities in said dye in acid, filtering out the dye molecules, and recovering the dye molecules as purified nigrosine dye for use in the process of claim 2.

4. The process of claims 1, 2 or 3 including the additional step of filtering said final ink formulation to remove insoluble oils.

5. The process of claim 3 wherein the final ink formulation is a drop-on-demand formulation of the approximate composition

| | Weight % |
|---|---|
| Nigrosine dye | 14.0 |
| Polyethylene Glycol | 20.0 |
| Diethylene Glysol | 20.0 |
| N—Methyl-2-Pyrrolidone | 8.0 |
| Diethylene glycol monobutyl ether | 8.0 |

| | Weight % |
|---|---|
| Trisodium salt of N—hydroxy-ethylethylenediamine triacetic acid | 0.5 |
| Surfactant | 0.4 |
| Sodium-2-pyridinethiol-1-oxide | 0.2 |
| Ammonium Hydroxide | 2.0 |
| Water | 27.4 | as compared to the diluted concentrate formulation of about

| | Weight % |
|---|---|
| Nigrosine dye | 7.0 |
| Polyethylene Glycol | 10.0 |
| Diethylene Glycol | 10.0 |
| N—Methyl Pyrrolidone | 4.0 |
| Diethylene glycol monobutyl ether | 4.0 |
| Tetramethyl decynediol | 0.25 |
| Surfactant | 0.2 |
| Sodium-2-pyridinethiol-1-oxide | 0.1 |
| Ammonium Hydroxide | 1.0 |
| Water | 33.45 |

6. The process of claim 3 wherein the final ink formulation is a continuous stream formulation of the approximate formulation

| | Weight % |
|---|---|
| Nigrosine Dye | 7.0 |
| Polyethylene Glycol | 10.0 |
| Diethylene Glycol | 10.0 |
| Butyl Carbitol | 4.0 |
| N—Methyl-2-Pyrrolidone | 4.0 |
| Tetramethyl decynediol | 0.25 |
| Surfactant | 0.2 |
| Trisodium salt of N—hydroxy-ethylethylenediamine triacetic acid | 0.5 |
| Sodium-2-pyridinethiol-1-oxide | 0.1 |
| Water | 62.95 |
| Ammonium Hydroxide | 1.0 | as compared to the diluted concentrate formulation of about

| | Weight % |
|---|---|
| Nigrosine dye | 7.0 |
| Polyethylene Glycol | 10.0 |
| Diethylene Glycol | 10.0 |
| N—Methyl Pyrrolidone | 4.0 |
| Diethylene glycol monobutyl ether | 4.0 |
| Tetramethyl decynediol | 0.25 |
| Surfactant | 0.2 |
| Sodium-2-pyridinethiol-1-oxide | 0.1 |
| Ammonium Hydroxide | 1.0 |
| Water | 33.45 |

* * * * *